(12) United States Patent
Huang (10) Patent No.: US 10,170,064 B2
(45) Date of Patent: Jan. 1, 2019

(54) CIRCUIT FOR PROCESSING GATE VOLTAGE SIGNAL SUPPLIED FOR LIQUID CRYSTAL DISPLAY DEVICE

(71) Applicant: Shenzhen China Star Optoelectronics Technology Co., Ltd., Shenzhen, Guangdong (CN)

(72) Inventor: Xiaoyu Huang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 218 days.

(21) Appl. No.: 15/128,193

(22) PCT Filed: Jul. 12, 2016

(86) PCT No.: PCT/CN2016/089796
§ 371 (c)(1),
(2) Date: Sep. 22, 2016

(87) PCT Pub. No.: WO2017/197746
PCT Pub. Date: Nov. 23, 2017

(65) Prior Publication Data
US 2018/0174537 A1    Jun. 21, 2018

(30) Foreign Application Priority Data

May 20, 2016 (CN) .......................... 2016 1 0339044

(51) Int. Cl.
*G09G 3/36* (2006.01)
*G02F 1/13* (2006.01)

(52) U.S. Cl.
CPC ............ *G09G 3/3648* (2013.01); *G02F 1/13* (2013.01); *G09G 3/3677* (2013.01);
(Continued)

(58) Field of Classification Search
CPC ......... G09G 3/3648; G09G 2300/0408; G09G 2320/0223; G09G 3/3677; G09G 3/3696; G02F 1/13
See application file for complete search history.

(56) References Cited

U.S. PATENT DOCUMENTS 5,587,722 A * 12/1996 Suzuki ................. G09G 3/3677
                                                          345/208
5,917,465 A    6/1999 Mochizuki
(Continued)

FOREIGN PATENT DOCUMENTS

CN         1692398 A    11/2005
CN       101312016 A    11/2008
(Continued)

*Primary Examiner* — Dmitriy Bolotin
(74) *Attorney, Agent, or Firm* — Andrew C. Cheng (57) ABSTRACT

The invention provides a circuit for processing a gate voltage signal supplied for a liquid crystal display device. The circuit includes an input-output circuit and a control circuit. The input-output circuit receives the gate voltage signal. The control circuit receives a control signal and is subjected to the control of the control signal to make the input-output circuit to output first through fourth output signals in first through fourth time segments respectively during each period based on the gate voltage signal. In the circuit for processing a gate voltage signal supplied for a liquid crystal display device according to any one exemplary embodiment of the invention, the gate voltage signal can be changed to be different values in different time segments of each period so as to decrease voltage dropping speed of the gate voltage signal, impact on a reference voltage of the liquid crystal display device is reduced.

9 Claims, 4 Drawing Sheets (52) U.S. Cl.
CPC ... *G09G 3/3696* (2013.01); *G09G 2300/0408* (2013.01); *G09G 2320/0223* (2013.01)

(56) References Cited

U.S. PATENT DOCUMENTS

| | | | | |
|---|---|---|---|---|
| 7,002,542 | B2* | 2/2006 | Lee | G09G 3/3677 345/94 |
| 7,907,106 | B2* | 3/2011 | Shin | G09G 3/3696 345/100 |
| 2001/0033266 | A1* | 10/2001 | Lee | G09G 3/3677 345/94 |
| 2002/0000966 | A1* | 1/2002 | Kudo | G09G 3/2007 345/87 |
| 2005/0248550 | A1* | 11/2005 | Kobayashi | G09G 3/3677 345/204 |
| 2008/0291148 | A1* | 11/2008 | Yin | G09G 3/3696 345/98 |
| 2010/0214204 | A1* | 8/2010 | Fanchiang | G09G 3/3614 345/94 |
| 2011/0267335 | A1 | 11/2011 | Lee | |
| 2013/0170292 | A1* | 7/2013 | Georgescu | G11C 8/08 365/184 |
| 2015/0371711 | A1* | 12/2015 | Choy | G11C 16/24 365/185.23 |

FOREIGN PATENT DOCUMENTS

| CN | 10770750 A | 7/2010 |
|---|---|---|
| CN | 104795040 A | 7/2015 |
| CN | 105118472 A | 12/2015 |
| CN | 105405423 A | 3/2016 |

\* cited by examiner

CIRCUIT FOR PROCESSING GATE VOLTAGE SIGNAL SUPPLIED FOR LIQUID CRYSTAL DISPLAY DEVICE

BACKGROUND OF THE INVENTION

1. Field of the Disclosure

The invention relates to a circuit, and more particularly to a circuit for processing a gate voltage signal supplied for a liquid crystal display device.

2. Description of Related Art

With the development of science and technology, screens of electronic products tend to have more ultra-narrow borders. Therefore, a liquid crystal display device with a gate driver integrated onto an array substrate (also referred to as GOA) has attracted more and more attention.

During a process of driving a liquid crystal display device by a gate voltage signal, a voltage dropping speed of the gate voltage signal would affect a reference voltage of the liquid crystal display device, the faster the voltage of the gate voltage signal drops, the greater the degree of influence on the reference voltage of the liquid crystal display device is.

The gate voltage signal generally is a square wave signal, in the conventional liquid crystal display device, a gate driving voltage is supplied to the liquid crystal display device by a PCB, and therefore a chamfer chip can be added onto the PCB for reducing the voltage dropping speed of the gate voltage signal (i.e., chamfering the gate voltage signal), so as to reduce the impact on the reference voltage of the liquid crystal display device.

However, in the GOA type liquid crystal display device, because the gate voltage is generated on the array substrate, there is no enough space to mount the chamfer chip on the substrate, and therefore it cannot adjust the gate voltage signal, the display effect of the liquid crystal display device is affected consequently.

Accordingly, the conventional manner of supplying the gate voltage signal for the GOA type liquid crystal display device would greatly affect the reference voltage of the liquid crystal display device.

SUMMARY

An exemplary embodiment of the invention is to provide a circuit for processing a gate voltage signal supplied for a liquid crystal display device. The circuit can overcome the drawback that the conventional gate voltage signal supplied for a liquid crystal display device with gate driver integrated onto an array substrate (GOA) would cause a great impact on the reference voltage of the liquid crystal display device.

According to an exemplary embodiment of the invention, a circuit for processing a gate voltage signal supplied for a liquid crystal display device is provided and includes: an input-output circuit and a control circuit. The input-output circuit is configured (i.e., structured and arranged) for receiving the gate voltage signal. The control circuit is configured for receiving a control signal and being subjected to the control of the control signal to make the input-output circuit to output a first output signal in a first time segment, a second output signal in a second time segment, a third output signal in a third time segment and a fourth output signal in a fourth time segment during each period based on the gate voltage signal.

Optionally, the first time segment, the second time segment, the third time segment and the fourth time segment each are a successive time segment in time, the sum of lengths of duration of the first time segment, the second time segment and the third time segment is equal to a length of duration of an active voltage level of the gate voltage signal, a length of duration of the fourth time segment is equal to a length of duration of an inactive voltage level of the gate voltage signal.

Optionally, a difference between a voltage value of the first output signal and a voltage value of an active voltage level of the gate voltage signal is in a first predetermined range, a voltage value of the second output signal is less than the voltage value of the first output signal, a voltage value of the third output signal is less than the voltage value of the second output signal, and a difference between a voltage value of the fourth output signal and a voltage value of an inactive voltage level of the gate voltage signal is in a second predetermined range.

Optionally, the control signal includes a first control signal and a second control signal, a period of the first control signal and a period of the second control signal are the same as the period of the gate voltage signal. The first control signal has a first voltage level and the second control signal has a second voltage level in the second time segment, the first control signal has the second voltage level and the second control signal has the first voltage level in the third time segment, the first control signal and the second control signal in the other time segments both have the first voltage level or both have the second voltage level.

Optionally, the first voltage level is one of a high level and a low level, the second voltage level is the other one of the high level and the low level and different from the first voltage level.

Optionally, the input-output circuit includes a first resistor. A first connecting terminal of the first resistor is configured for receiving the gate voltage signal, and a second connecting terminal of the first resistor acts as an output port for outputting the first output signal, the second output signal, the third output signal and the fourth output signal.

Optionally, the control circuit includes a first switch, a second switch, a third switch and a fourth switch. A first connecting terminal of the first switch is connected to the second connecting terminal of the first resistor, a second connecting terminal of the first switch is connected to a first connecting terminal of the second switch, and a control terminal of the first switch is configured for receiving the first control signal. A second connecting terminal of the second switch is connected to ground, and a control terminal of the second switch is configured for receiving the second control signal. A first connecting terminal of the third switch is connected to the second connecting terminal of the first resistor, a second connecting terminal of the third switch is connected to a first connecting terminal of the fourth switch, and a control terminal of the third switch is configured for receiving the first control signal. A second connecting terminal of the fourth switch is connected to ground, and a control terminal of the fourth switch is configured for receiving the second control signal.

Optionally, the first switch and the fourth switch are PMOS transistors, the second switch and the third switch are NMOS transistors.

Optionally, for each of the first switch, the second switch, the third switch and the fourth switch, the control terminal is a gate electrode, the first connecting terminal is one of a source electrode and a drain electrode, and the second connecting terminal is the other one of the source electrode and the drain electrode and different from the first connecting terminal.

Optionally, the circuit for processing a gate voltage signal supplied for a liquid crystal display device is disposed in a fan-out area of a liquid crystal display device with a gate driver integrated onto an array substrate.

In the circuit for processing a gate voltage signal supplied for a liquid crystal display device according to any one exemplary embodiment, the voltage dropping speed of the gate voltage signal can be decreased by changing the gate voltage signal to be different values in different time segments during each period, so that the impact on a reference voltage of the liquid crystal display device is reduced.

BRIEF DESCRIPTION OF THE DRAWINGS

The above and other objectives and advantages of exemplary embodiments of the invention will be more apparent from the following detailed description taken in conjunction with drawings of exemplarily illustrating embodiments, in which.

DETAILED DESCRIPTION OF EMBODIMENTS

In the following, exemplary embodiments of the invention will be fully described with reference to the accompanying drawings, and the exemplary embodiments will be illustrated in the accompanying drawings. However, the exemplary embodiments can be implemented in many different forms and the invention should not be construed as being limited to the exemplary embodiments set forth herein. On the contrary, these embodiments are provided to make the present disclosure be more thorough and complete, and will fully convey the scope of the exemplary embodiments to those skilled in the art.

Figure 1:
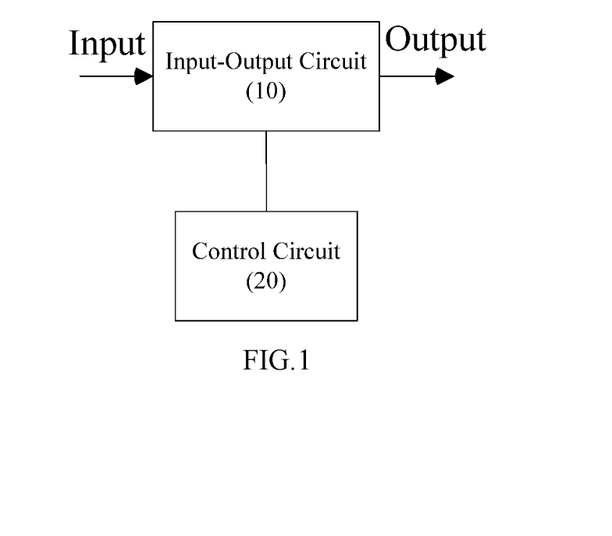
FIG. 1 is a block diagram of a circuit for processing a gate voltage signal supplied for a liquid crystal display device according to an exemplary embodiment of the invention.

FIG. 1 is a block diagram of a circuit for processing a gate voltage signal supplied for a liquid crystal display device according to an exemplary embodiment of the invention.

Figure 7:
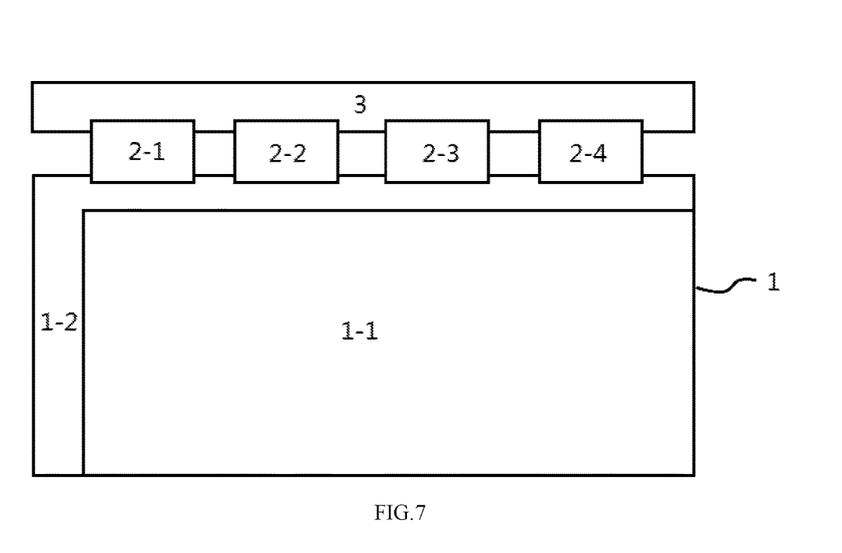
FIG. 7 is a schematic view of a liquid crystal display device being disposed with a circuit for processing a gate voltage signal supplied for a liquid crystal display device.

As an example, the circuit for processing a gate voltage signal supplied for a liquid crystal display device associated with the invention is disposed in a fan-out area of a liquid crystal display device with a gate driver integrated onto an array substrate (also referred to as GOA, Gate on array). For example, FIG. 7 shows a circuit for processing a gate voltage signal supplied for a liquid crystal display device being disposed in a liquid crystal display device. As shown in FIG. 7, a display panel 1 of the GOA type liquid crystal display device is connected to a PCB 3 by source driver chips 2-1, 2-2, 2-3 and 2-4. A gate diver is integrated on the left side of a display area 1-1, i.e., a gate voltage signal is supplied to the liquid crystal display device from the left side. Therefore, the circuit for processing a gate voltage signal supplied for a liquid crystal display device associated with the invention can be disposed in a fan-out area 1-2 on the left side of the display area 1-1 of the GOA type liquid crystal display device, so as to process the gate voltage signal.

Herein, the gate voltage signal may be a square wave signal with a predetermined period. The gate voltage signal may have an active voltage level (e.g., high level) and an inactive voltage level (e.g., low level) in one period. As an example, the gate voltage signal may have a period same as a time length of the liquid crystal display device displaying one frame.

Referring to FIG. 1, the circuit for processing a gate voltage signal supplied for a liquid crystal display device according to the exemplary embodiment of the invention includes an input-output circuit 10 and a control circuit 20.

Specifically speaking, the input-output circuit 10 is configured (i.e., structured and arranged) for receiving the gate voltage signal. The control circuit 20 is configured for receiving a control signal and being subjected to the control of the control signal to make the input-output circuit 10 output a first output signal in a first time segment, a second output signal in a second time segment, a third output signal in a third time segment and a fourth output signal in a fourth time segment during each period based on the gate voltage signal.

Herein, as an example, the control signal received by the control circuit 20 may include a first control signal and a second control signal. A period of the first control signal and a period of the second control signal are same as the period of the gate voltage signal. For example, the first control signal and the second control signal are square wave signals. Specifically speaking, in the second time segment, the first control signal may have a first voltage level and the second control signal has a second voltage level; in the third time segment, the first control signal may have the second voltage level and the second control signal has the first voltage level; and in the other time segments, the first control signal and the second control signal may both have the first voltage level or both have the second voltage level. Herein, as an example, the first voltage level may be one of a high level and a low level, and the second voltage level is the other of the high level and the low level and different from the first voltage level.

Herein, the sum of time lengths of the first time segment, the second time segment, the third time segment and the fourth time segment is equal to the time length of one period (i.e., a period of output signal from the input-output circuit 10), and the time length of one period is equal to the time length of the period of the gate voltage signal.

As an example, the first time segment, the second time segment, the third time segment and the fourth time segment are successive time segments in time, the sum of lengths of duration of the first time segment, the second time segment and the third time segment is equal to the length of duration of the active voltage level of the gate voltage signal, and the length of duration of the fourth time segment is equal to the length of duration of the inactive voltage level of the gate voltage signal.

Herein, a voltage value of the first output signal may be close to a voltage value of the active voltage level of the gate voltage signal, a voltage value of the second output signal and a voltage value of the third output signal may be lower than the voltage value of the active voltage level of the gate voltage signal, and a voltage value of the fourth output signal may be close to a voltage value of the inactive voltage level of the gate voltage signal, and therefore the voltage dropping speed of the gate voltage signal can be reduced.

As an example, a difference between the voltage value of the first output signal and the voltage value of the active voltage level of the gate voltage signal is in a first predetermined range, the voltage value of the second output signal is less than the voltage value of the first output signal, the voltage value of the third output signal is less than the voltage value of the second output signal, and a difference between the voltage value of the fourth output signal and the voltage value of the inactive voltage level of the gate voltage signal is in a second predetermined range.

In a practical application of the circuit, the input-output circuit 10 may include a first resistor. Specifically speaking, a first connecting terminal of the first resistor receives the gate voltage signal, and a second connecting terminal of the first resistor acts as an output port for outputting the first output signal, the second output signal, the third output signal and the fourth output signal.

The control circuit 20 may include: a first switch, a second switch, a third switch and a fourth switch. Specifically speaking, a first connecting terminal of the first switch is connected to the second connecting terminal of the first resistor, a second connecting terminal of the first switch is connected to a first connecting terminal of the second switch, and a control terminal of the first switch receives a first control signal. A second connecting terminal of the second switch is grounded, and a control terminal of the second switch receives a second control signal. A first connecting terminal of the third switch is connected to the second connecting terminal of the first resistor, a second connecting terminal of the third switch is connected to a first connecting terminal of the fourth switch, and a control terminal of the third switch receives the first control signal. A second connecting terminal of the fourth switch is grounded, and a control terminal of the fourth switch receives the second control signal.

Herein, in order to provide the first output signal, the second output signal, the third output signal and the fourth output signal in different time segments according to the above mentioned control signals, as an example, the first switch and the fourth switch both are PMOS transistors, the second switch and the third switch both are NMOS transistors. More specifically, for each switch of the first switch, the second switch, the third switch and the fourth switch, the control terminal may be a gate electrode, the first connecting terminal may be one of a source electrode and a drain electrode, and the second connecting terminal may be the other one of the source electrode and the drain electrode and different from the first connecting terminal.

Figure 2:
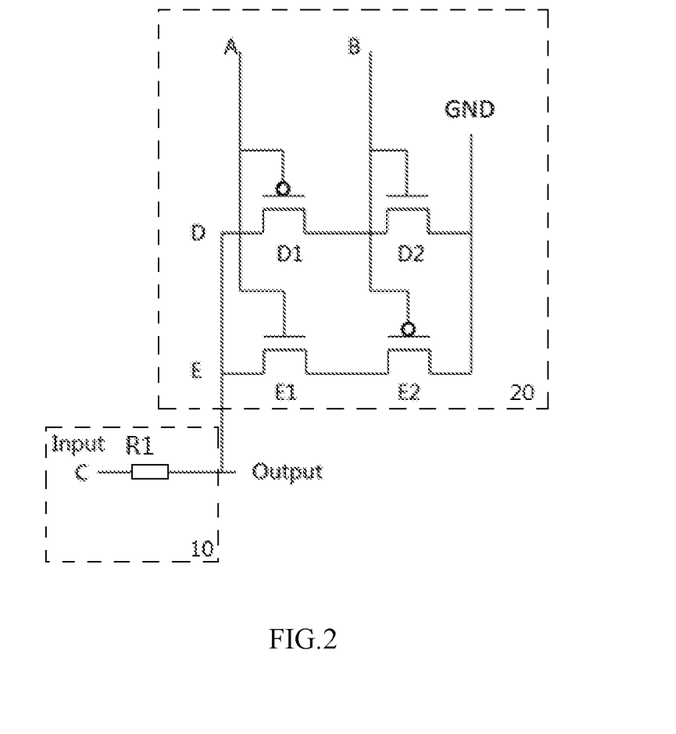
FIG. 2 is a circuit diagram of the circuit for processing a gate voltage signal supplied for a liquid crystal display device according to the exemplary embodiment of the invention.

FIG. 2 shows a circuit diagram of the circuit for processing a gate voltage signal supplied for a liquid crystal display device according to the exemplary embodiment of the invention.

As shown in FIG. 2, the input-output circuit 10 may include a first resistor R1. A first connecting terminal of the first resistor R1 acts as an input port for receiving a gate voltage signal from a node C, and a second connecting terminal of the first resistor R1 acts as an output port for outputting the first output signal, the second output signal, the third output signal and the fourth output signal.

The control circuit 20 may includes a first PMOS transistor D1, a first NMOS transistor D2, a second NMOS transistor E1 and a second PMOS transistor E2. A source electrode (or a drain electrode) of the first PMOS transistor D1 is connected to the second connecting terminal of the first resistor R1, the drain electrode (or the source electrode) of the first PMOS transistor D1 is connected to a source electrode (or a drain electrode) of the first NMOS transistor D2, and a gate electrode of the first PMOS transistor D1 receives a first control signal A. The drain electrode (or the source electrode) of the first NMOS transistor D2 is grounded, and a gate electrode of the first NMOS transistor D2 receives a second control signal B. A source electrode (or a drain electrode) of the second NMOS transistor E1 is connected to the second connecting terminal of the first resistor R1, the drain electrode (or the source electrode) of the second NMOS transistor E1 is connected to a source electrode (or a drain electrode) of the second PMOS transistor E2, and a gate electrode of the second NMOS transistor E1 receives the first control signal A. The drain electrode (or the source electrode) of the second PMOS transistor E2 is grounded, and a gate electrode of the second PMOS transistor E2 receives the second control signal B.

Specifically speaking, when the first control signal A and the second control signal B have same voltage levels (for example, in the first time segment and the fourth time segment of one period), the first PMOS transistor D1 and the first NMOS transistor D2 in D branch both are turned off, the second NMOS transistor E1 and the second PMOS transistor E2 in E branch both are turned off, at this time, the output terminal of the first resistor R1 may output a voltage value close to a voltage value of the gate voltage signal.

When the first control signal A and the second control signal B have different voltage levels (for example, in the second time segment and the third time segment of one period), the first PMOS transistor D1 and the first NMOS transistor D2 in the D branch both are turned on and connected to ground, or the second NMOS transistor E1 and the second PMOS transistor E2 in the E branch both are turned on and connected to ground. At this time, because the first PMOS transistor D1, the first NMOS transistor D2, the second NMOS transistor E1 and the second PMOS transistor E2 each have a certain resistance, when the D branch or the E branch is communicated to ground, the voltage on the output port of the first resistor R1 would be reduced.

In an exemplary embodiment, when the first control signal A has a low level (e.g., 0V) and the second control signal B has a high level (e.g., 3.3V) in the second time segment of one period, the first PMOS transistor D1 and the first NMOS transistor D2 in the D branch both are turned on and communicated to ground, the second NMOS transistor E1 and the second PMOS transistor E2 of the E branch both are turned off. At this time, the circuit for processing a gate voltage signal supplied for a liquid crystal display device according to the exemplary embodiment is equivalent to a circuit as shown in FIG. 3.

Figure 3:
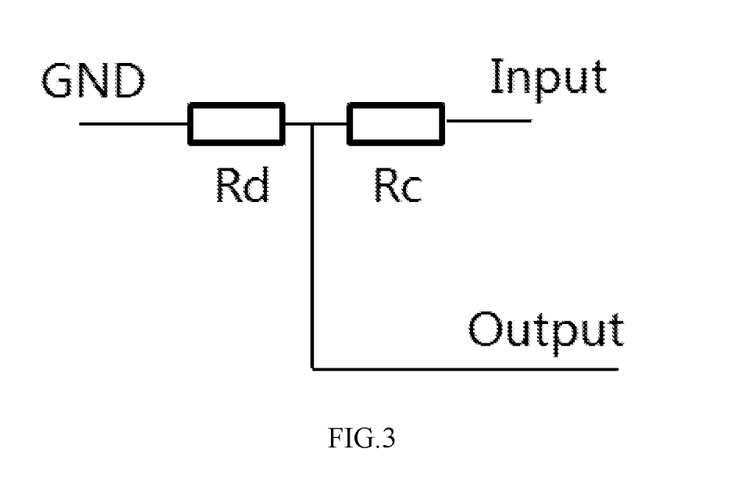
FIG. 3 is a first equivalent circuit diagram of the circuit for processing a gate voltage signal supplied for a liquid crystal display device according to the exemplary embodiment of the invention.

FIG. 3 shows a first equivalent circuit diagram of the circuit for processing a gate voltage signal supplied for a liquid crystal display device according to the exemplary embodiment.

As illustrated in FIG. 3, the second resistor Rd is an equivalent resistor of the first PMOS transistor D1, the first NMOS transistor D2 and connection wires in the D branch, the third resistor Rc is an equivalent resistor of the first resistor R1, the connection wire between the first connecting terminal of the first resistor R1 and the input port and the connection wire between the second connecting terminal of the first resistor R1 and the output port.

Therefore, in the second time segment, the voltage value outputted on the output port is Rd/(Rd+Rc), so that the voltage of the signal outputted on the output port can be adjusted by adjusting the resistances of Rc and Rd.

In another exemplary embodiment, when the first control signal A has a high level (e.g., 3.3V) and the second control signal B has a low level (e.g., 0V) in the third time segment of one period, the first PMOS transistor D1 and the first NMOS transistor D2 in the D branch both are turned off, the second NMOS transistor E1 and the second PMOS transistor E2 in the E branch both are turned on and communicated to ground. At this time, the circuit for processing a gate voltage signal supplied for a liquid crystal display device according to the exemplary embodiment of the invention is equivalent to a circuit as shown in FIG. 4.

Figure 4:
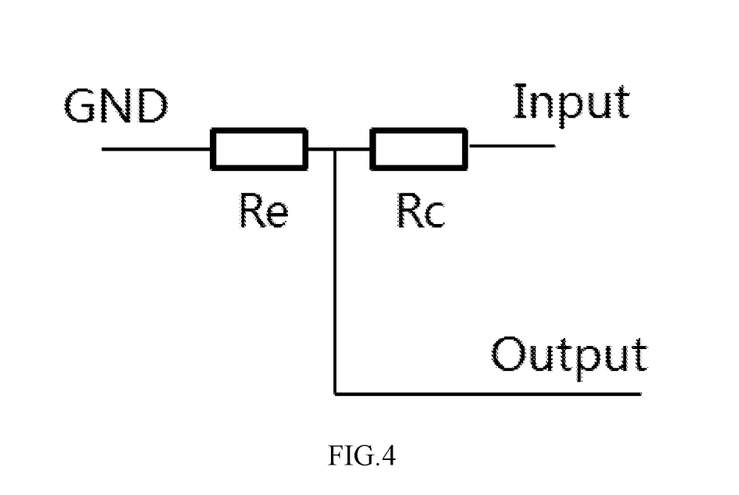
FIG. 4 is a second equivalent circuit diagram of the circuit for processing a gate voltage signal supplied for a liquid crystal display device according to the exemplary embodiment of the invention.

FIG. 4 shows a second equivalent circuit diagram of the circuit for processing a gate voltage signal supplied for a liquid crystal display device according to the exemplary embodiment of the invention.

As illustrated in FIG. 4, the fourth resistor Re is an equivalent resistor of the second NMOS transistor E1, the second PMOS transistor E2 and connection wires in the E branch, the third resistor Rc is an equivalent resistor of the first resistor R1, the connection wire between the first connecting terminal of the first resistor R1 and the input port and the connection wire between the second connecting terminal of the first resistor R1 and the output port.

Therefore, in the third time segment, a voltage value outputted from the output port is Re/(Re+Rc), so that the voltage of the signal outputted from the output port can be adjusted by adjusting the resistances of Rc and Re.

Generally, the gate voltage signal is a square wave signal with an active voltage level of 33V and an inactive voltage level of (−7V). In the following, such gate voltage signal is taken as an example to illustrate an exemplary embodiment of the output signals outputted from the input-output circuit 10.

Figure 5:
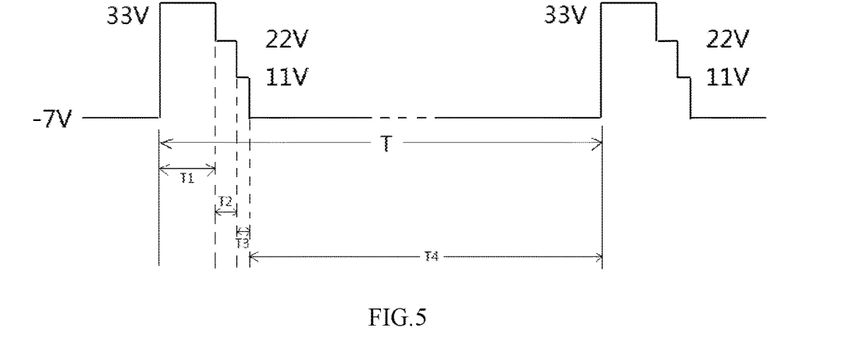
FIG. 5 is a schematic view of output signals of the circuit for processing a gate voltage signal supplied for a liquid crystal display device according to the exemplary embodiment of the invention.

FIG. 5 shows a schematic view of output signals of the circuit for processing a gate voltage signal supplied for a liquid crystal display device according to the exemplary embodiment of the invention.

As shown in FIG. 5, a period of output signals outputted from the output port of the input-output circuit 10 is T (i.e., the period of the gate voltage signal is T).

In the first time segment T1, the first control signal A and the second control signal B have same voltage levels, the D branch is turned off and the E branch is turned off, the output port of the input-output circuit 10 outputs the first output signal with a voltage value close to 33V. Herein, the difference between the voltage value of the first output signal and the voltage value of the high level of the gate voltage signal may be in a first predetermined range (e.g., (−10%, 0)).

In the second time segment T2, the first control signal A and the second control signal B have different voltage levels, the D branch is turned on (e.g., Rd=2Rc) or the E branch is turned on (e.g., Re=2Rc), the output port of the input-output circuit 10 outputs the second output signal with a voltage close to 22V.

In the third time segment T3, the voltage level of the first control signal A is phase-inverted and the second control signal B is phase-inverted, at this time, the other one of the D branch and the E branch is turned on (e.g., Re=1/2Rc or Rd=1/2Rc), the output port of the input-output circuit 10 outputs the third output signal with a voltage value close to 11V.

In the fourth time segment T4, the first control signal A and the second control signal B return to have same voltage levels, the D branch is turned off and the E branch is turned off, the output port of the input-output circuit 10 outputs the fourth output signal with a voltage value close to (−7V). Herein, the difference between the voltage value of the fourth output signal and the voltage value of the low level of the gate voltage signal may be in a second predetermined range (e.g., (−10%, 0)).

It should be understood that, the voltage value of the active voltage level and the voltage value of the inactive voltage level of the gate voltage signal as shown in FIG. 5 only are an example, according to actual requirement, the voltage value of the active voltage level and the voltage value of the inactive voltage level of the gate voltage signal can be other values. The voltage value of the second output signal and the voltage value of the third output signal also only are an example, and according to actual requirement, the voltage value of the second output signal and the voltage value of the third output signal can be changed to be other values by changing the resistance(s) of the second resistor Rd, the third resistor Rc and/or the fourth resistor Re.

In addition, because it is required that the difference between the voltage value of the first output signal and the voltage value of the active voltage level of the gate voltage signal is as small as possible and the difference between the voltage value of the fourth output signal and the voltage value of the inactive voltage level of the gate voltage signal is as small as possible, the resistance of the third resistor Rc is required to be relatively small. Therefore, in actual application, when the resistance of a conductive wire of the input-output circuit 10 can meet the resistance requirement of Rc, the first resistor R1 in FIG. 2 can be omitted, so as to further reduce the required area by the circuit on the liquid crystal panel.

Figure 6:
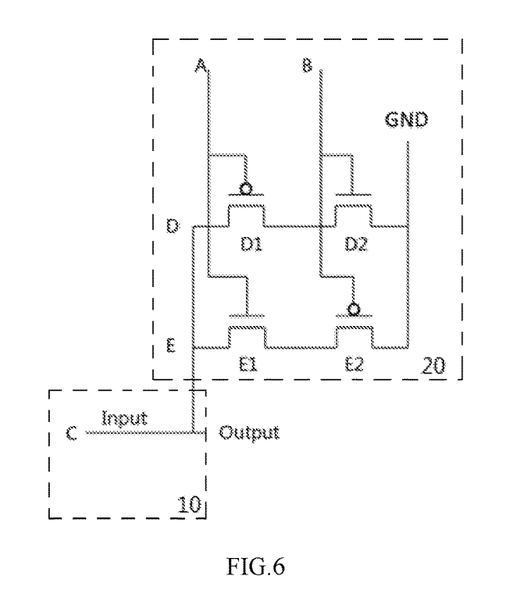
FIG. 6 is a circuit diagram of a circuit for processing a gate voltage signal supplied for a liquid crystal display device according to another exemplary embodiment of the invention.

FIG. 6 is a circuit diagram of a circuit for processing a gate voltage signal supplied for a liquid crystal display device according to another exemplary embodiment of the invention.

As shown in FIG. 6, the circuit for processing a gate voltage signal supplied for a liquid crystal display device according to another exemplary embodiment of the invention removes the first resistor R1 in FIG. 2, and at this situation a wire resistance of connection wire between the input port and the output port of the input-output circuit 10 is equivalent to the third resistor Rc, and therefore by adjusting Rd and Re in FIG. 4 and FIG. 5, the circuit shown in FIG. 6 also can output output signals having the waveforms of the output signals in FIG. 5.

In summary, in the circuit for processing a gate voltage signal supplied for a liquid crystal display device according to any one exemplary embodiment of the invention, by changing the gate voltage signal to be different values in different time segments of each period so as to decrease the voltage dropping speed of the gate voltage signal, the impact on a reference voltage of the liquid crystal display device is reduced consequently.

Although the invention has been illustrated and described with reference to exemplary embodiment, those skilled in the art should be understood that without departing from the spirit and scope of the invention defined by claims, various modifications in forms and details can be made.

What is claimed is:

1. A circuit for processing a gate voltage signal supplied for a liquid crystal display device, comprising: an input-output circuit and a control circuit;

wherein the input-output circuit is configured for receiving the gate voltage signal, the control circuit is configured for receiving a control signal and being subjected to the control of the control signal to make the input-output circuit to output a first output signal in a first time segment, a second output signal in a second time segment, a third output signal in a third time segment and a fourth output signal in a fourth time segment during each period based on the gate voltage signal;

wherein the control signal comprises a first control signal and a second control signal, a period of the first control signal and a period of the second control signal are the same as a period of the gate voltage signal, the first control signal has a first voltage level and the second control signal has a second voltage level in the second time segment, the first control signal has the second voltage level and the second control signal has the first voltage level in the third time segment, the first control signal and the second control signal in the other time segments both have the first voltage level or both have the second voltage level.

2. The circuit as claimed in claim 1, wherein the first time segment, the second time segment, the third time segment and the fourth time segment are successive time segments in time, the sum of lengths of duration of the first time segment, the second time segment and the third time segment is equal to a length of duration of an active voltage level of the gate voltage signal, a length of duration of the fourth time segment is equal to a length of duration of an inactive voltage level of the gate voltage signal.

3. The circuit as claimed in claim 1, wherein a difference between a voltage value of the first output signal and a voltage value of an active voltage level of the gate voltage signal is in a first predetermined range, a voltage value of the second output signal is less than the voltage value of the first output signal, a voltage value of the third output signal is less than the voltage value of the second output signal, and a difference between a voltage value of the fourth output signal and a voltage value of an inactive voltage level of the gate voltage signal is in a second predetermined range.

4. The circuit as claimed in claim 1, wherein the first voltage level is one of a high level and a low level, the second voltage level is the other one of the high level and the low level and different from the first voltage level.

5. The circuit as claimed in claim 1, wherein the input-output circuit comprises a first resistor; a first connecting terminal of the first resistor is configured for receiving the gate voltage signal, and a second connecting terminal of the first resistor acts as an output port for outputting the first output signal, the second output signal, the third output signal and the fourth output signal.

6. The circuit as claimed in claim 5, wherein the control circuit comprises a first switch, a second switch, a third switch and a fourth switch;

a first connecting terminal of the first switch is connected to the second connecting terminal of the first resistor, a second connecting terminal of the first switch is connected to a first connecting terminal of the second switch, and a control terminal of the first switch is configured for receiving the first control signal;

a second connecting terminal of the second switch is connected to ground, and a control terminal of the second switch is configured for receiving the second control signal;

a first connecting terminal of the third switch is connected to the second connecting terminal of the first resistor, a second connecting terminal of the third switch is connected to a first connecting terminal of the fourth switch, and a control terminal of the third switch is configured for receiving the first control signal;

a second connecting terminal of the fourth switch is connected to ground, and a control terminal of the fourth switch is configured for receiving the second control signal.

7. The circuit as claimed in claim 6, wherein the first switch and the fourth switch are PMOS transistors, the second switch and the third switch are NMOS transistors.

8. The circuit as claimed in claim 7, wherein for each of the first switch, the second switch, the third switch and the fourth switch, the control terminal is a gate electrode, the first connecting terminal is one of a source electrode and a drain electrode, and the second connecting terminal is the other one of the source electrode and the drain electrode and different from the first connecting terminal.

9. The circuit as claimed in claim 1, wherein the circuit for processing a gate voltage signal supplied for a liquid crystal display device is disposed in a fan-out area of a liquid crystal display device with a gate driver integrated onto an array substrate.

* * * * *